US012804434B2

(12) United States Patent
Uy et al.

(10) Patent No.: US 12,804,434 B2
(45) Date of Patent: Nov. 17, 2026

(54) SYSTEMS AND METHODS FOR IDENTIFYING SECURITY ISSUES DURING A NETWORK ATTACHMENT

(71) Applicant: Verizon Patent and Licensing Inc., Basking Ridge, NJ (US)

(72) Inventors: Warren Hojilla Uy, Randolph, NJ (US); Young Rak Choi, Belle Mead, NJ (US); Dayong He, Bridgewater, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 552 days.

(21) Appl. No.: 17/931,605

(22) Filed: Sep. 13, 2022

(65) Prior Publication Data

US 2024/0089768 A1 Mar. 14, 2024

(51) Int. Cl.

| | |
|---|---|
| ***H04W 24/10*** | (2009.01) |
| ***H04L 41/16*** | (2022.01) |
| ***H04W 76/10*** | (2018.01) |

(52) U.S. Cl.

CPC ............. *H04W 24/10* (2013.01); *H04L 41/16* (2013.01); *H04W 76/10* (2018.02)

(58) Field of Classification Search

CPC ........ H04L 41/16; H04W 24/10; H04W 76/10

See application file for complete search history.

(56) References Cited

U.S. PATENT DOCUMENTS

| | | | | |
|---|---|---|---|---|
| 8,832,790 | B1 * | 9/2014 | Villa | G06F 21/31 726/4 |
| 2022/0014963 | A1 * | 1/2022 | Yeh | G06N 3/045 |
| 2022/0038902 | A1 * | 2/2022 | Mueck | H04L 63/1433 |
| 2022/0124543 | A1 * | 4/2022 | Orhan | H04W 28/021 |
| 2022/0279341 | A1 * | 9/2022 | Tomala | G06N 20/00 |
| 2023/0188982 | A1 * | 6/2023 | Sivanesan | H04W 12/06 455/411 |
| 2024/0298194 | A1 * | 9/2024 | Mueck | G06N 20/00 |
| 2024/0349082 | A1 * | 10/2024 | Li | H04W 24/02 |
| 2024/0414565 | A1 * | 12/2024 | Futaki | H04L 43/06 |

* cited by examiner

*Primary Examiner* — Donald L Mills

(57) ABSTRACT

A device may receive an identification request or a radio resource control request, and may process the identification request or the radio resource control request, with a machine learning model, to determine whether the identification request or the radio resource control request is secure. The device may permit the identification request or the radio resource control request based on the machine learning model determining that the identification request or the radio resource control request is secure, or may deny the identification request or the radio resource control request based on the machine learning model determining that the identification request or the radio resource control request is unsecure.

20 Claims, 11 Drawing Sheets

SYSTEMS AND METHODS FOR IDENTIFYING SECURITY ISSUES DURING A NETWORK ATTACHMENT

BACKGROUND

A user equipment (UE) may utilize a protocol (e.g., a radio resource control (RRC) protocol) to establish a connection with a radio access network (RAN) and a core network (e.g., a fourth generation (4G) core network or a fifth generation (5G) core network), other UEs, and/or the like.

DETAILED DESCRIPTION OF EXAMPLE EMBODIMENTS

Figure 1A:
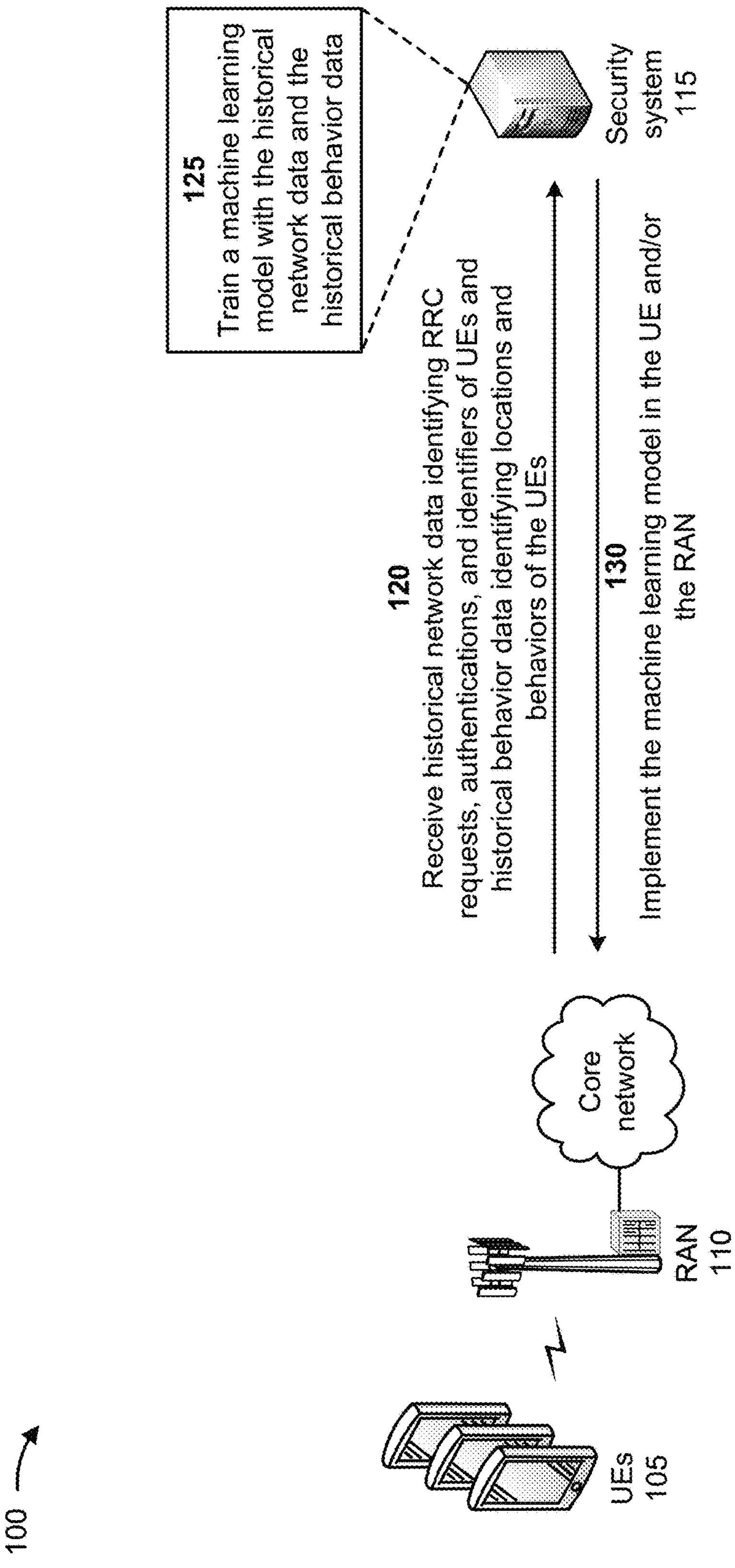
FIGS. 1A-1G are diagrams of an example associated with utilizing a machine learning model to identify security issues during a network attachment.

The following detailed description of example implementations refers to the accompanying drawings. The same reference numbers in different drawings may identify the same or similar elements.

Current mechanisms for attaching to a network fail to provide security for a UE. For example, the RRC protocol provides no confidentiality for the UE, no integrity for the UE, and may deplete a battery of the UE with constant RRC paging. Utilizing a subscription identity before authentication provides no confidentiality for the UE (e.g., in a 4G network) and no integrity for the UE (e.g., in 4G and 5G networks). User plane security provides optional integrity for the UE but is mostly not enabled in a 4G network and is only recommended in a 5G network. The failure to provide security may result in security and other issues for the UE and/or the network, such as a denial-of-service attack, a man-in-the-middle attack, impersonation of the UE, privacy violations for a user of the UE, eavesdropping on calls, intercepting messages, UE location tracking and poisoning, fake emergency message broadcasts, battery depletion, overbilling, a bidding down attack, and/or the like. Thus, current mechanisms for attaching to a network consume computing resources (e.g., processing resources, memory resources, communication resources, and/or the like), networking resources, and/or other resources associated with depleting a battery of a UE, generating traffic congestion in the network with network attacks, handling security breaches for the UE, losing network data based on network attacks, attempting to combat the network attacks, and/or the like.

Some implementations described herein provide a device (e.g., a UE, a RAN, or a security system) that utilizes a machine learning model to identify security issues during a network attachment. For example, the device may receive an identification request or a radio resource control request, and may process the identification request or the radio resource control request, with a machine learning model, to determine whether the identification request or the radio resource control request is secure. The device may permit the identification request or the radio resource control request based on the machine learning model determining that the identification request or the radio resource control request is secure, or may deny the identification request or the radio resource control request based on the machine learning model determining that the identification request or the radio resource control request is unsecure.

In this way, the device may utilize a machine learning model to identify security issues during a network attachment. For example, the device may train the machine learning model based on historical network data (e.g., historical data identifying RRC requests, UE authentications, UE identifiers, UE locations, and/or the like) and historical behavior data (e.g., historical data identifying behaviors of the UEs, UE locations, and/or the like). The device may utilize the machine learning model to identify and block unsecure identification requests and unsecure RRC requests from a network, to identify and block unsecure network attach requests and unsecure RRC requests from a UE, and/or the like. Thus, the device may conserve computing resources, networking resources, and/or other resources that would otherwise have been consumed in depleting a battery of a UE, generating traffic congestion in the network with network attacks, handling security breaches for the UE, losing network data based on network attacks, attempting to combat the network attacks, and/or the like.

FIGS. 1A-1G are diagrams of an example 100 associated with identifying and correcting issues associated with a wireless network. As shown in FIGS. 1A-1G, example 100 includes a plurality of UEs 105, a radio access network (RAN) 110, a core network, and a security system 115. In some implementations, the security system 115 may be included in the core network. Further details of the plurality of UEs 105, the RAN 110, the core network, and the security system 115 are provided elsewhere herein.

As shown in FIG. 1A, and by reference number 120, the security system 115 may receive historical network data identifying RRC requests, authentications, and identifiers of the plurality of UEs 105, and historical behavior data identifying locations and behaviors of the plurality of UEs 105. For example, the plurality of UEs 105 may be associated with identifiers (e.g., international mobile subscriber identities (IMSIs), mobile directory numbers (MDNs), and/or the like) and may generate or receive (e.g., from the RAN 110) RRC requests. The plurality of UEs 105 may be associated with authentications for attaching to the RAN 110 and/or the core network. The historical network data may include data identifying RRC requests, the authentications, and the identifiers of the plurality of UEs 105. In some implementations, the historical network data may include data identifying frequencies of the RRC requests, network device changes by the plurality of UEs 105, duplicate cell identifiers associated with the plurality of UEs 105, and/or the like. The plurality of UEs 105 may be located at various geographical locations over time and may be associated with various behaviors (e.g., moving from one location to another location, conducting transactions at particular locations, and/or the like) over time. The historical behavior data may include data identifying the various locations of the plurality of UEs 105 over time, the various behaviors of the plurality of UEs 105 over time, and/or the like. In some implementations, the historical behavior data may include data identifying last known locations and times associated with the plurality of UEs 105, identifiers of wireless access points (WAPs) utilized by the plurality of UEs 105, locations of the WAPs utilized by the plurality of UEs 105, and/or the like.

The security system 115 may continuously receive the historical network data and the historical behavior data from the plurality of UEs 105, the RAN 110, and/or the core network, may periodically receive the historical network data and the historical behavior data from the plurality of UEs 105, the RAN 110, and/or the core network, may receive the historical network data and the historical behavior data based on requesting the historical network data and the historical behavior data from the plurality of UEs 105, the RAN 110, and/or the core network.

As further shown in FIG. 1A, and by reference number 125, the security system 115 may train a machine learning model with the historical network data and the historical behavior data. For example, the security system 115 may train, validate, and/or test a machine learning model with the historical network data and the historical behavior data to generate a trained machine learning model. For example, the security system 115 may divide the historical network data and the historical behavior data into a first portion of data, a second portion of data, and a third portion of data. The first portion, the second portion, and the third portion may include a same quantity of the historical network data and the historical behavior data, different quantities of the historical network data and the historical behavior data, and/or the like. In some implementations, more of the historical network data and the historical behavior data may be allotted to the first portion of data since the first portion may be utilized to generate the training dataset for the machine learning model.

The security system 115 may generate a training dataset for the machine learning model based on the first portion of data. The security system 115 may generate a validation dataset for the machine learning model based on the second portion of data. The security system 115 may generate a test dataset for the machine learning model based on the third portion of data. In other implementations, the security system 115 may utilize different portions of the historical network data and the historical behavior data to generate the training dataset, the validation dataset, and/or the test dataset for the machine learning model.

The security system 115 may train the machine learning model with the training dataset to generate the trained machine learning model. As described elsewhere herein, the machine learning model may be trained to process identification requests, network attach requests, and RRC requests, and determine whether the identification requests, the network attach requests, and the RRC requests are secure. In some implementations, rather than training the machine learning model, the security system 115 may obtain the trained machine learning model from another system or device that trained the machine learning model. In this case, the security system 115 may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include a pattern recognition model. A pattern recognition model may include a model that automatically recognizes patterns and regularities in data. An example of a pattern recognition model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space), and/or the like.

In some implementations, the security system 115 may train the machine learning model with the training dataset to generate the trained machine learning model, and may process the validation dataset, with the trained machine learning model, to validate that the trained machine learning model is operating correctly. If the trained machine learning model is operating correctly, the security system 115 may process the trained machine learning model, with the test dataset, to further ensure that the trained machine learning model is operating correctly. A trained machine learning model can be said to be operating correctly if it has adequate accuracy, has adequate precision, has adequate recall, is not subject to excessive overfitting, and/or the like. If the trained machine learning model is operating excessively incorrectly, the security system 115 may modify the trained machine learning model and may revalidate and/or retest the modified machine learning model based on the validation dataset and/or the test dataset. Further details of the machine learning model are provided below in connection with FIG. 2.

As further shown in FIG. 1A, and by reference number 130, the security system 115 may implement the machine learning model in a UE 105 and/or the RAN 110. For example, the security system 115 may provide the trained machine learning model to the UE 105 and/or the RAN 110. The UE 105 and/or the RAN 110 may receive the trained machine learning model and may store the trained machine learning model in data structures (e.g., databases, tables, lists, and/or the like) associated with the UE 105 and/or the RAN 110. In some implementations, if the security system 115 updates the machine learning model, the security system 115 may provide the updated machine learning model to the UE 105 and/or the RAN 110. In this way, the security system 115 may provide continuous learning and training to improve the machine learning model.

Figure 1B:
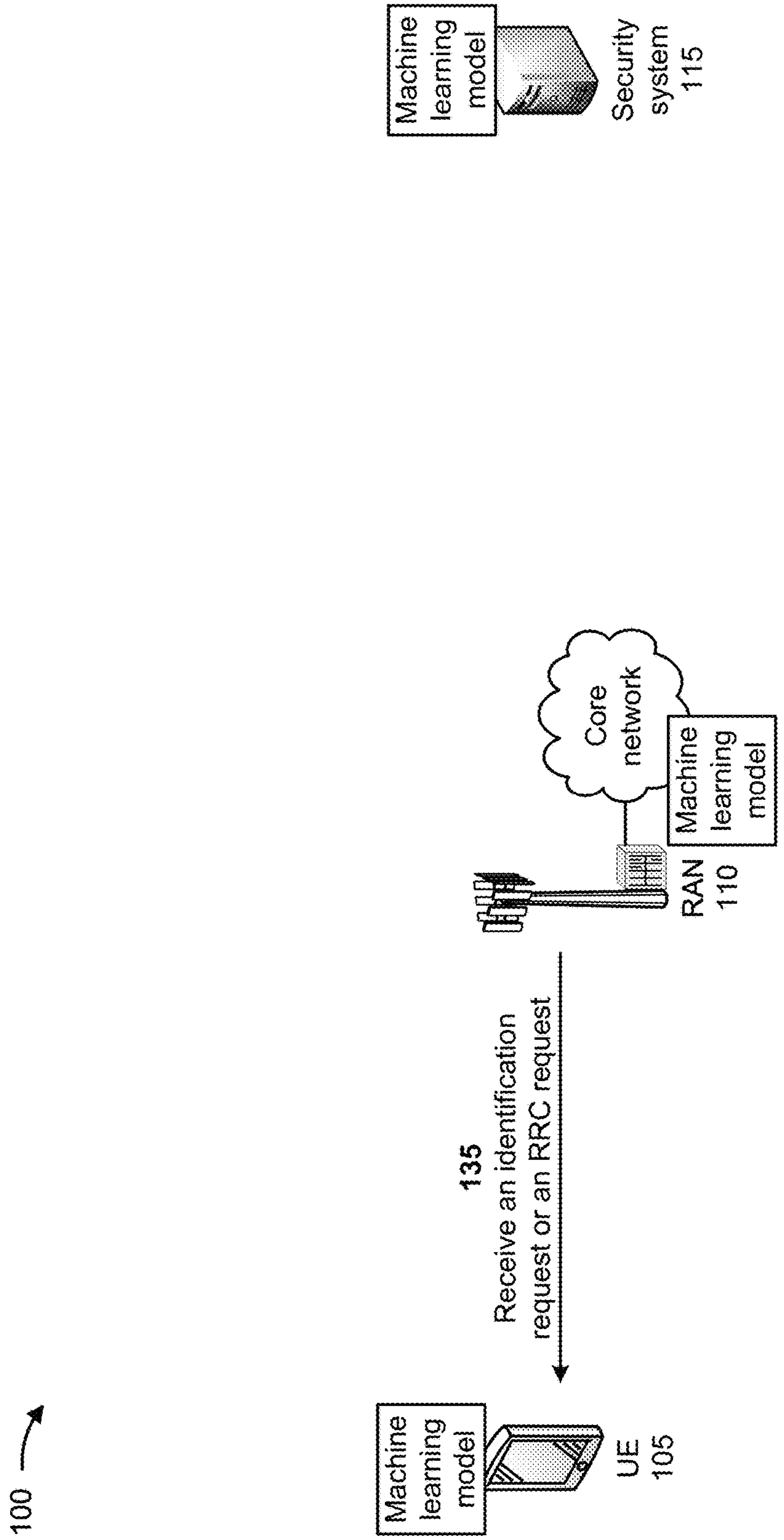

As shown in FIG. 1B, and by reference number 135, the UE 105 may receive an identification request or an RRC request. For example, the RAN 110 and/or the core network may generate the identification request or the RRC request. Alternatively, a bad actor may generate the identification request or the RRC request in an attempt to improperly obtain information from the UE 105. The RAN 110, or a device associated with the bad actor, may provide the identification request or the RRC request to the UE 105, and the UE 105 may receive the identification request or the RRC request.

Figure 1C:
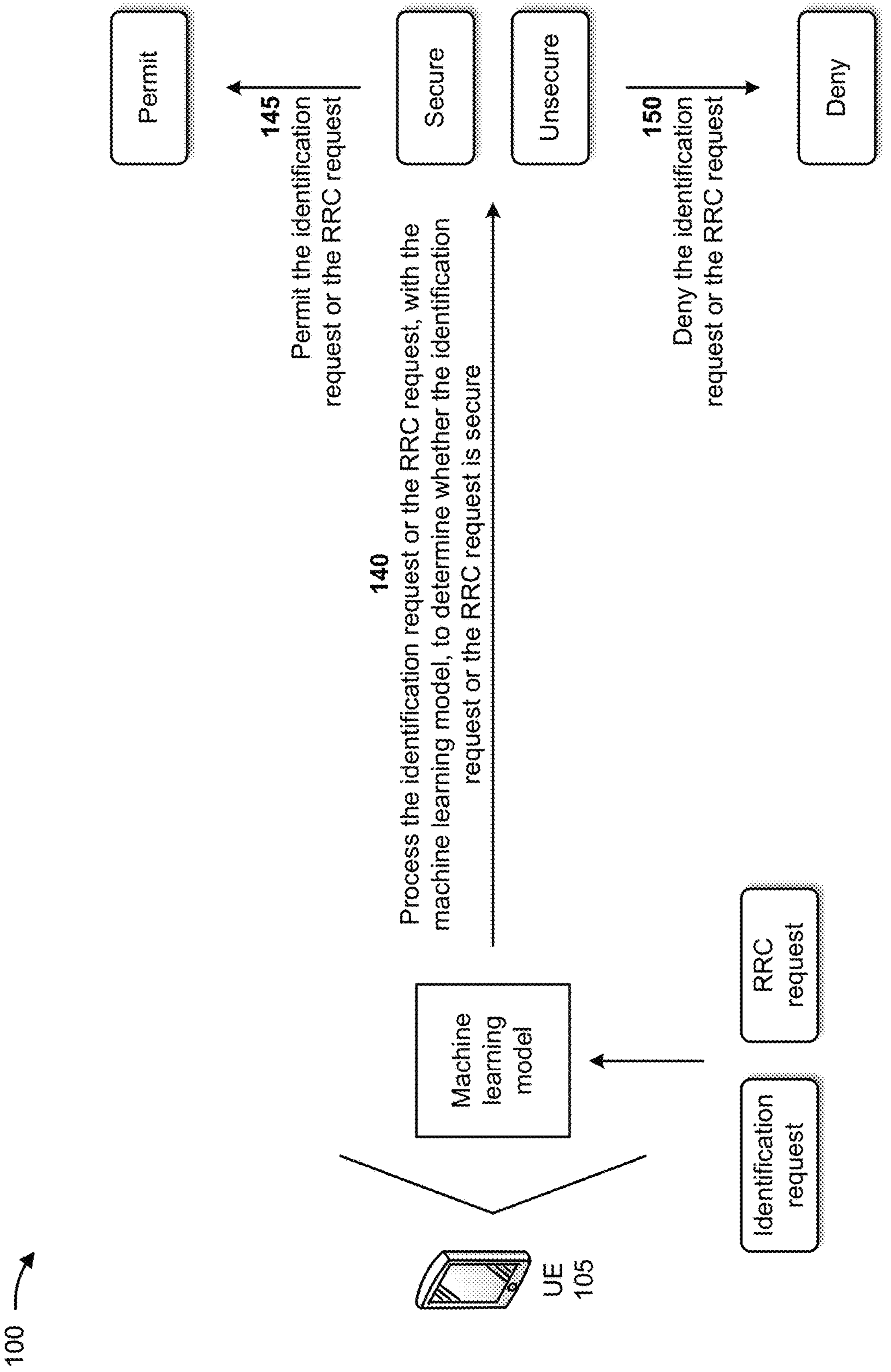

As shown in FIG. 1C, and by reference number 140, the UE 105 may process the identification request or the RRC request, with the machine learning model, to determine whether the identification request or the RRC request is secure. For example, the UE 105 may utilize the trained machine learning model received from the security system 115 to determine whether the identification request or the RRC request is secure. In some implementations, the machine learning model may determine that the identification request or the RRC request is secure when the identification request or the RRC request is an original identification request or an original RRC request. In some implementations, the machine learning model may determine that the identification request or the RRC request is unsecure when the identification request or the RRC request is a repeated identification request or a repeated RRC request. Repeated identification requests or repeated RRC requests may be associated with a pattern of bad actors attempting to misappropriate information from the UE 105.

As further shown in FIG. 1C, and by reference number 145, the UE 105 may permit the identification request or the RRC request based on the machine learning model determining that the identification request or the RRC request is secure. For example, if the machine learning model determines that the identification request or the RRC request is secure, the UE 105 may permit the identification request or the RRC request. In some implementations, based on permitting the identification request, the UE 105 may respond to the identification request by providing an identifier of the UE 105 in response to the identification request. The identifier may include a subscription permanent identifier (SUPI) assigned to the UE 105 or a subscription concealed identifier (SUCI) assigned to the UE 105. The SUCI is a global identifier that conceals an identity of the UE 105, and can be used by visiting networks to get authentication vectors from a home network. In some implementations, the UE 105 may establish an RRC connection with the core network based on permitting the RRC request.

As further shown in FIG. 1C, and by reference number 150, the UE 105 may deny the identification request or the RRC request based on the machine learning model determining that the identification request or the RRC request is unsecure. For example, if the machine learning model determines that the identification request or the RRC request is unsecure, the UE 105 may deny the identification request or the RRC request. In some implementations, based on denying the identification request or the RRC request, the UE 105 may discard the identification request or the RRC request, may generate a response, to the identification request or the RRC request, indicating that the identification request or the RRC request is denied, may report the identification request or the RRC request to a fraud service, and/or the like.

Figure 1D:
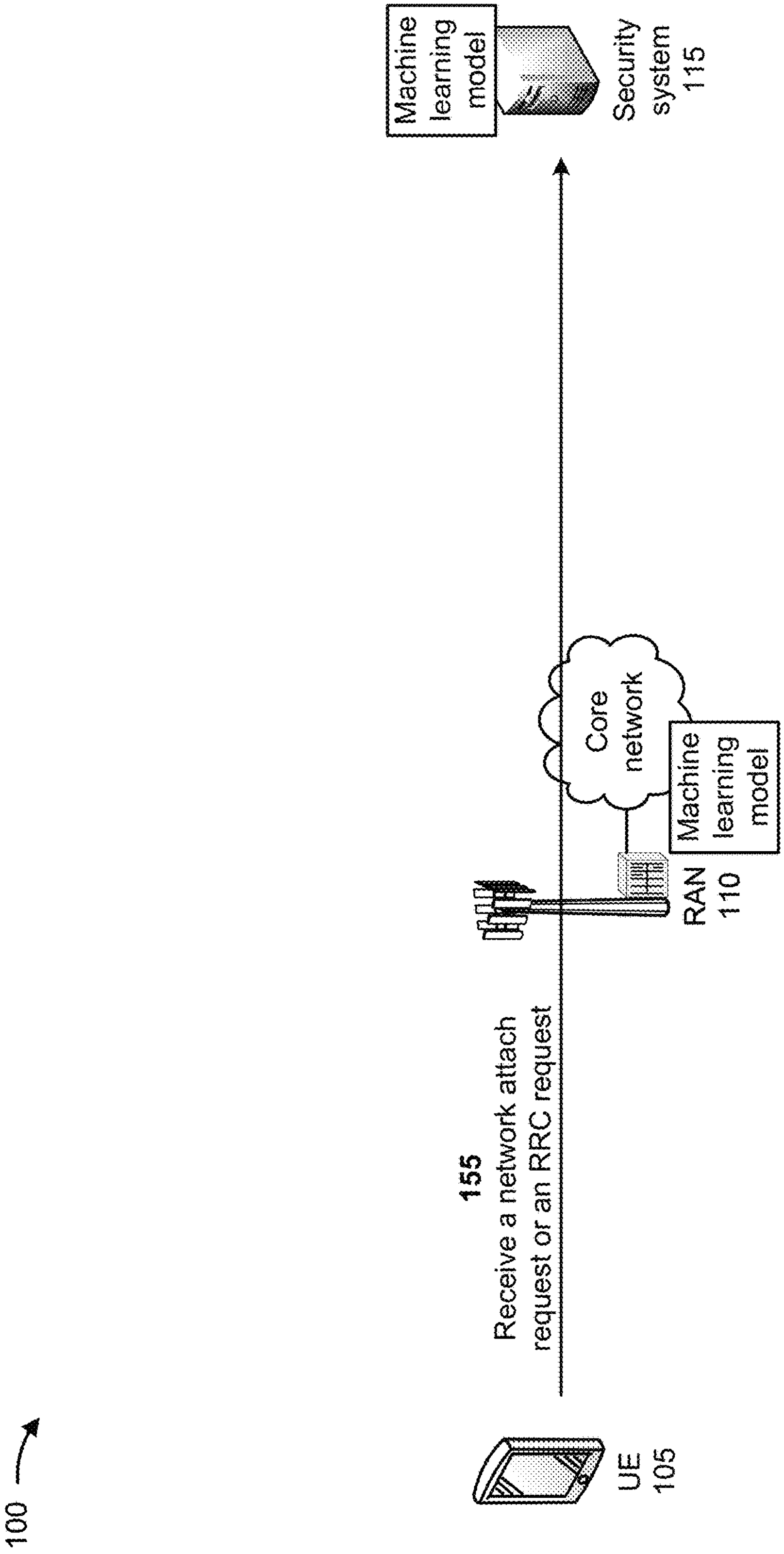

As shown in FIG. 1D, and by reference number 155, the RAN 110 and/or the security system 115 may receive a network attach request or an RRC request. For example, the UE 105 may generate the network attach request or the RRC request. Alternatively, a bad actor may generate the network attach request or the RRC request in an attempt to improperly obtain information from the RAN 110 and/or the core network. The UE 105 or a device associated with the bad actor may provide the network attach request or the RRC request to the RAN 110, and the RAN 110 may receive the network attach request or the RRC request. The RAN 110 may provide the network attach request or the RRC request to the security system 115, and the security system 115 may receive the network attach request or the RRC request.

Figure 1E:
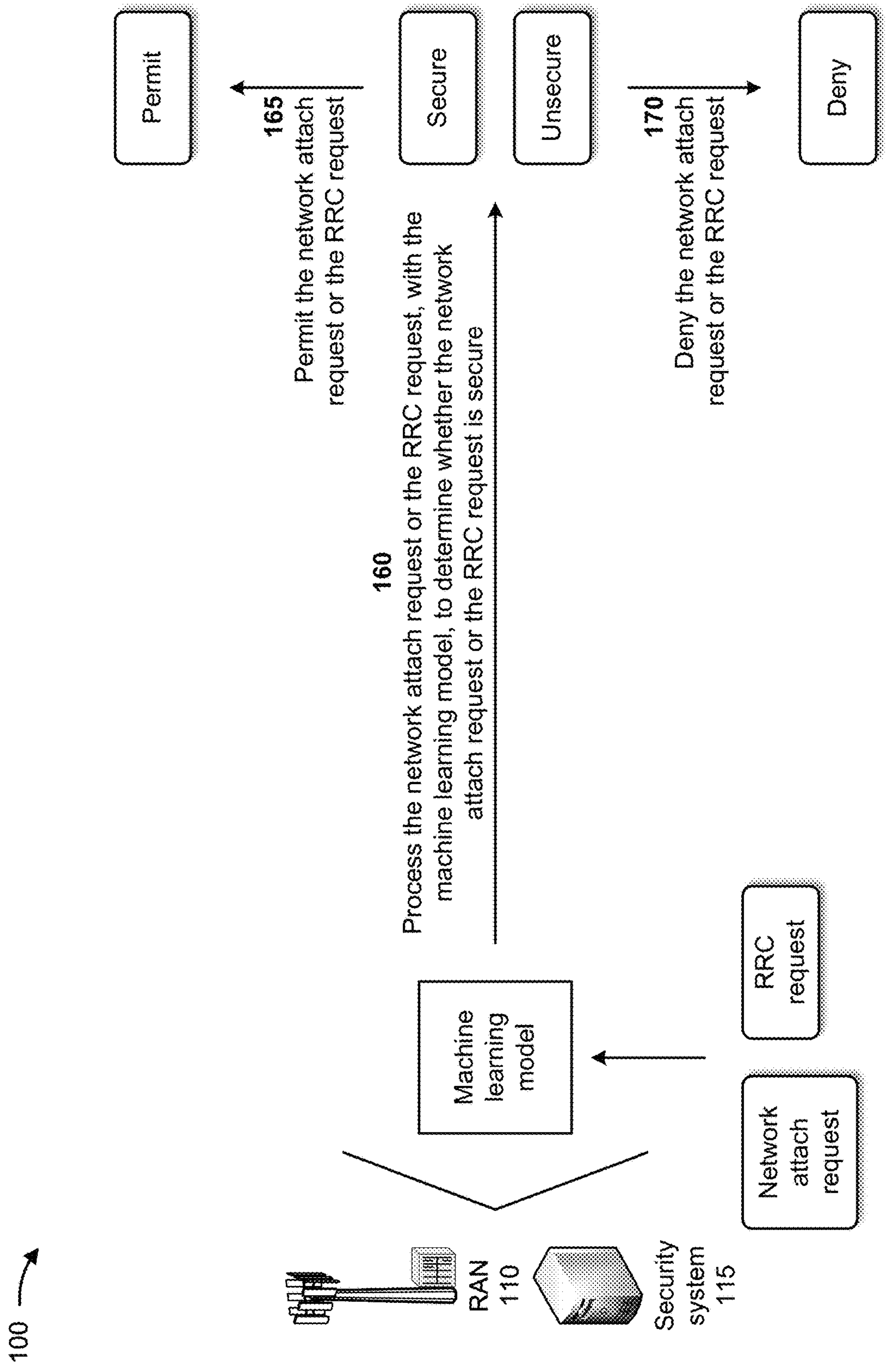

As shown in FIG. 1E, and by reference number 160, the RAN 110 and/or the security system 115 may process the network attach request or the RRC request, with the machine learning model, to determine whether the network attach request or the RRC request is secure. For example, the RAN 110 and/or the security system 115 may utilize the trained machine learning model to determine whether the network attach request or the RRC request is secure. In some implementations, the machine learning model may determine that the network attach request or the RRC request is secure when the network attach request or the RRC request is provided from a location that is normally associated with the UE 105. In some implementations, the machine learning model may determine that the network attach request or the RRC request is unsecure when the network attach request or the RRC request is provided from a location that is not normally associated with the UE 105. Unusual behavior of a UE 105 (e.g., such as being located at an unusual location) may be associated with a pattern of bad actors attempting to misappropriate information from the RAN 110.

As further shown in FIG. 1E, and by reference number 165, the RAN 110 and/or the security system 115 may permit the network attach request or the RRC request based on the machine learning model determining that the network attach request or the RRC request is secure. For example, if the machine learning model determines that the network attach request or the RRC request is secure, the RAN 110 and/or the security system 115 may permit the network attach request or the RRC request. In some implementations, based on permitting the network attach request, the RAN 110 may respond to the network attach request by enabling the UE 105 to attach to the RAN 110. In some implementations, the RAN 110 may enable the UE 105 to establish an RRC connection with the core network based on permitting the RRC request.

As further shown in FIG. 1E, and by reference number 170, the RAN 110 and/or the security system 115 may deny the network attach request or the RRC request based on the machine learning model determining that the network attach request or the RRC request is unsecure. For example, if the machine learning model determines that the network attach request or the RRC request is unsecure, the RAN 110 and/or the security system 115 may deny the network attach request or the RRC request. In some implementations, based on denying the network attach request or the RRC request, the RAN 110 and/or the security system 115 may discard the network attach request or the RRC request, may generate a response, to the network attach request or the RRC request, indicating that the network attach request or the RRC request is denied, may report the network attach request or the RRC request to a fraud service, and/or the like.

Figure 1F:
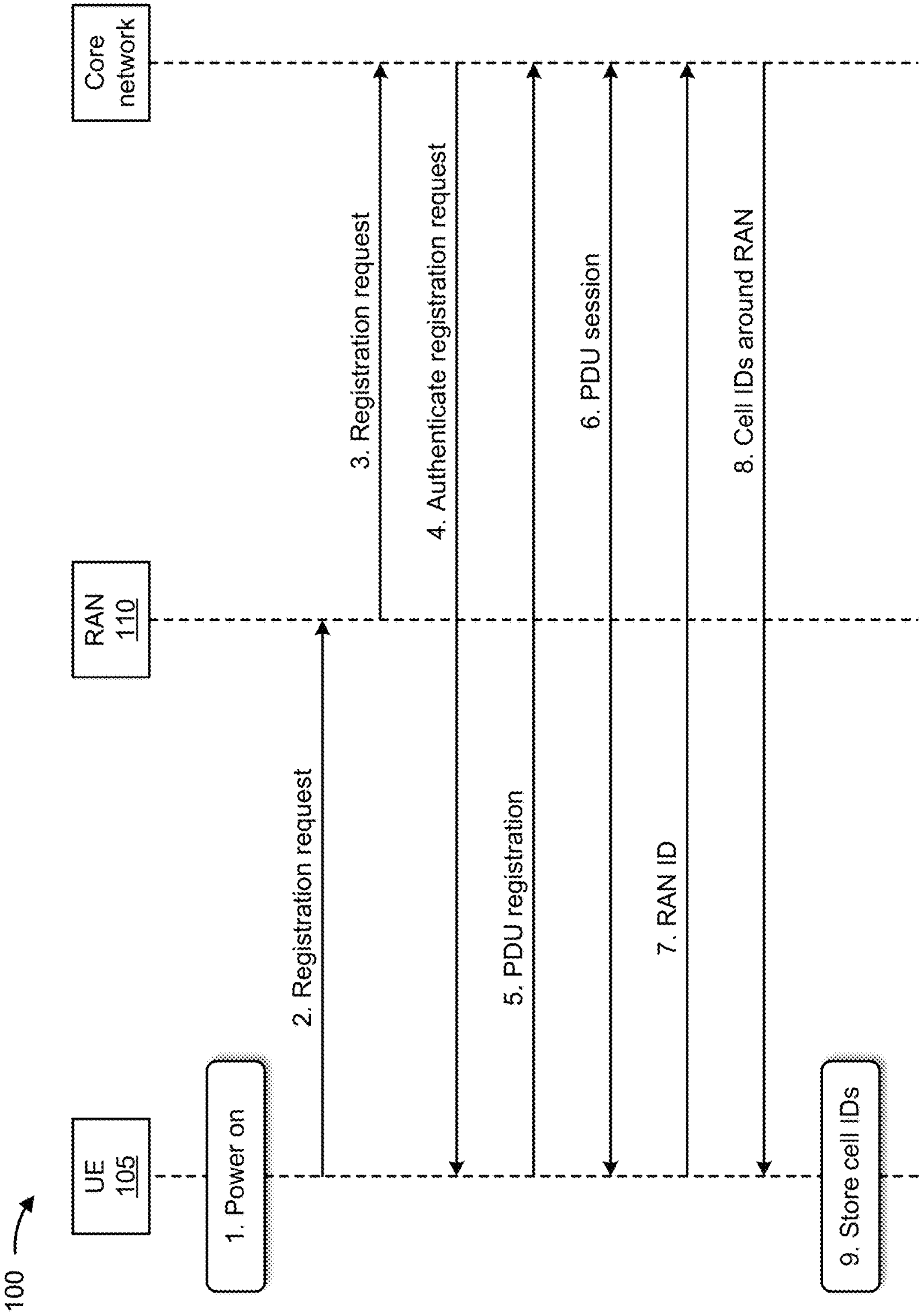
Figure 1G:
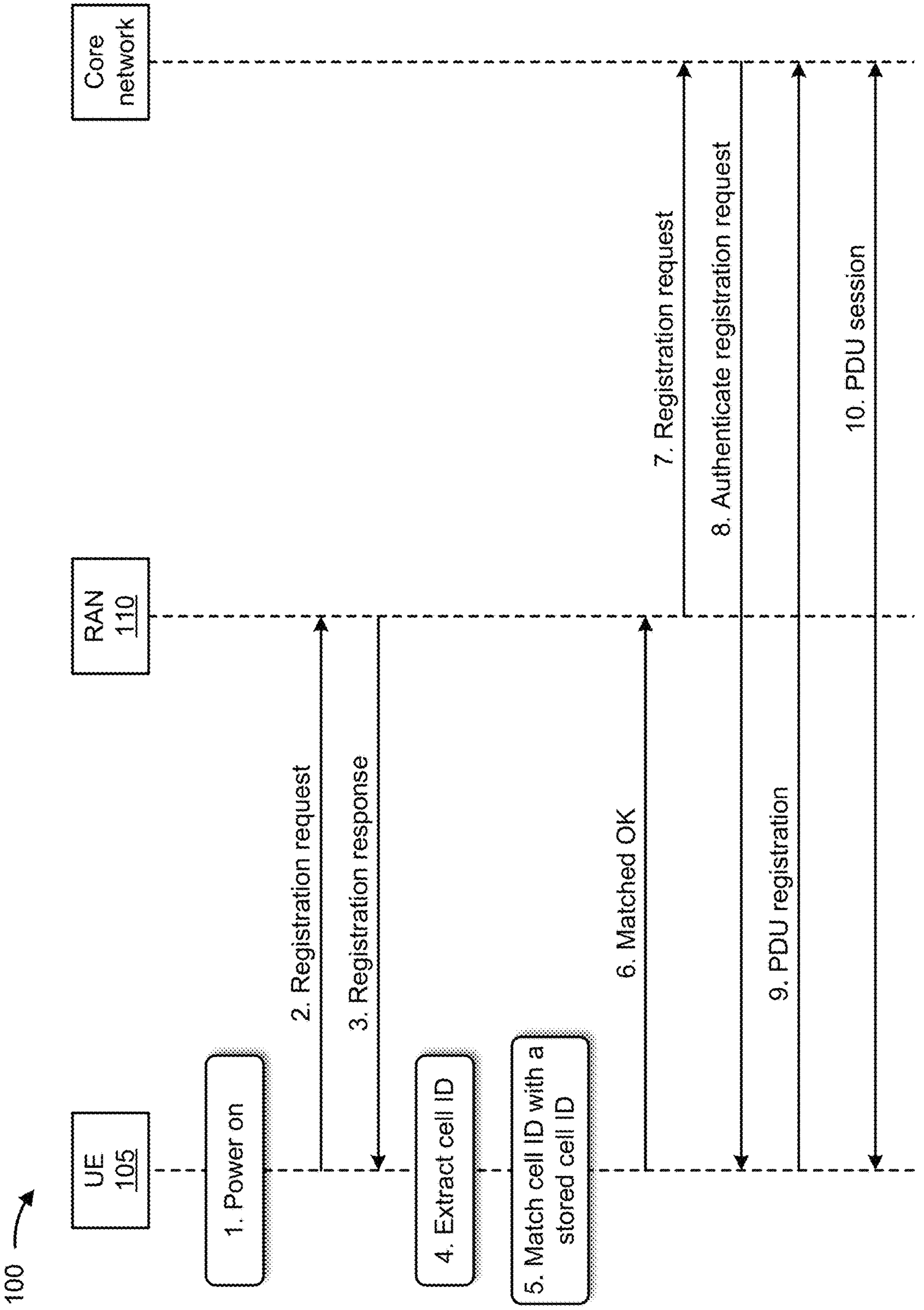

FIGS. 1F and 1G are call flow diagrams associated with identifying security issues during a network attachment. As shown at step 1 of FIG. 1F, the UE 105 may power on and may generate a registration request based on powering on. As shown at step 2, the UE 105 may provide the registration request to the RAN 110, and the RAN 110 may receive the registration request. As shown at step 3, the RAN 110 may provide the registration request to the core network. The registration request may include a request to register with and attach to the core network via the RAN 110. The core network may receive the registration request and may determine whether to authenticate the registration request (e.g., based on determining whether the UE 105 is authorized to attach to the core network). In this example, the core network may authenticate the registration request, and may generate a message indicating that the registration request is authenticated.

As shown at step 4 of FIG. 1F, the core network may provide, to the UE 105 and via the RAN 110, the message indicating that the registration request is authenticated. The UE 105 may receive the message and may generate a protocol data unit (PDU) registration request based on receiving the message. The PDU registration request may include a request to establish a PDU session between the UE 105 and the core network. As shown at step 5, the UE 105 may provide the PDU registration request to the core network, and the core network may receive the PDU registration request. As shown at step 6, the core network may establish the PDU session with the UE 105, via the RAN 110, based on the PDU registration request. As shown at step 7, the UE 105 may provide a RAN identifier (ID) to the core network, via the RAN 110. The core network may receive the RAN ID, and may identify cell IDs around the RAN 110 based on the RAN ID. As shown at step 8, the core network may provide the cell IDs around the RAN 110 to the UE 105. As shown at step 9, the UE 105 may receive the cell IDs around the RAN 110 and may store the cell IDs.

As shown at step 1 of FIG. 1G, the UE 105 may power on and may generate a registration request based on powering on. As shown at step 2, the UE 105 may provide the registration request to the RAN 110, and the RAN 110 may receive the registration request. As shown at step 3, the RAN 110 may generate a registration response based on the registration request, and may provide the registration response to the UE 105. In some implementations, the registration response may include a cell ID selected by the RAN 110 for use by the UE 105. As shown at step 4, the UE 105 may extract the cell ID from the registration response. As shown at step 5, the UE 105 may compare the cell ID and the stored cell IDs to determine whether the cell ID matches one of the stored cell IDs. If the cell ID fails to match one of the stored cell IDs, the UE 105 and/or the RAN 110 may deny the registration request as being unsecure. If the cell ID matches one of the stored cell IDs, the UE 105 may generate a message indicating that the cell ID matches one of the stored cell IDs. As shown at step 6, the UE 105 may provide, to the RAN 110, the message indicating that the cell ID matches one of the stored cell IDs.

As shown at step 7 of FIG. 1G, the RAN 110 may provide the registration request to the core network based on the message indicating that the cell ID matches one of the stored cell IDs. The registration request may include a request to register with and attach to the core network via the RAN 110. The core network may receive the registration request and may determine whether to authenticate the registration request (e.g., based on determining whether the UE 105 is authorized to attach to the core network). In this example, the core network may authenticate the registration request, and may generate a message indicating that the registration request is authenticated. As shown at step 8 of FIG. 1G, the core network may provide, to the UE 105 and via the RAN 110, the message indicating that the registration request is authenticated. The UE 105 may receive the message and may generate a PDU registration request based on receiving the message. The PDU registration request may include a request to establish a PDU session between the UE 105 and the core network. As shown at step 9, the UE 105 may provide the PDU registration request to the core network, and the core network may receive the PDU registration request. As shown at step 10, the core network may establish the PDU session with the UE 105, via the RAN 110 (e.g., and the cell ID), based on the PDU registration request.

In this way, a device (e.g., the UE 105, the RAN 110, and/or the security system 115) utilizes a machine learning model to identify security issues during a network attachment. For example, the device may train the machine learning model based on historical network data (e.g., historical data identifying RRC requests, UE authentications, UE identifiers, UE locations, and/or the like) and historical behavior data (e.g., historical data identifying behaviors of the UEs 105, UE locations, and/or the like). The device may utilize the machine learning model to identify and block, from a network, identification requests and RRC requests that are unsecure, to identify and block, from a UE, network attach requests and RRC requests that are unsecure, and/or the like. Thus, the device may conserve computing resources, networking resources, and/or other resources that would otherwise have been consumed in depleting a battery of a UE 105, generating traffic congestion in the network with network attacks, handling security breaches for the UE 105, losing network data based on network attacks, attempting to combat the network attacks, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
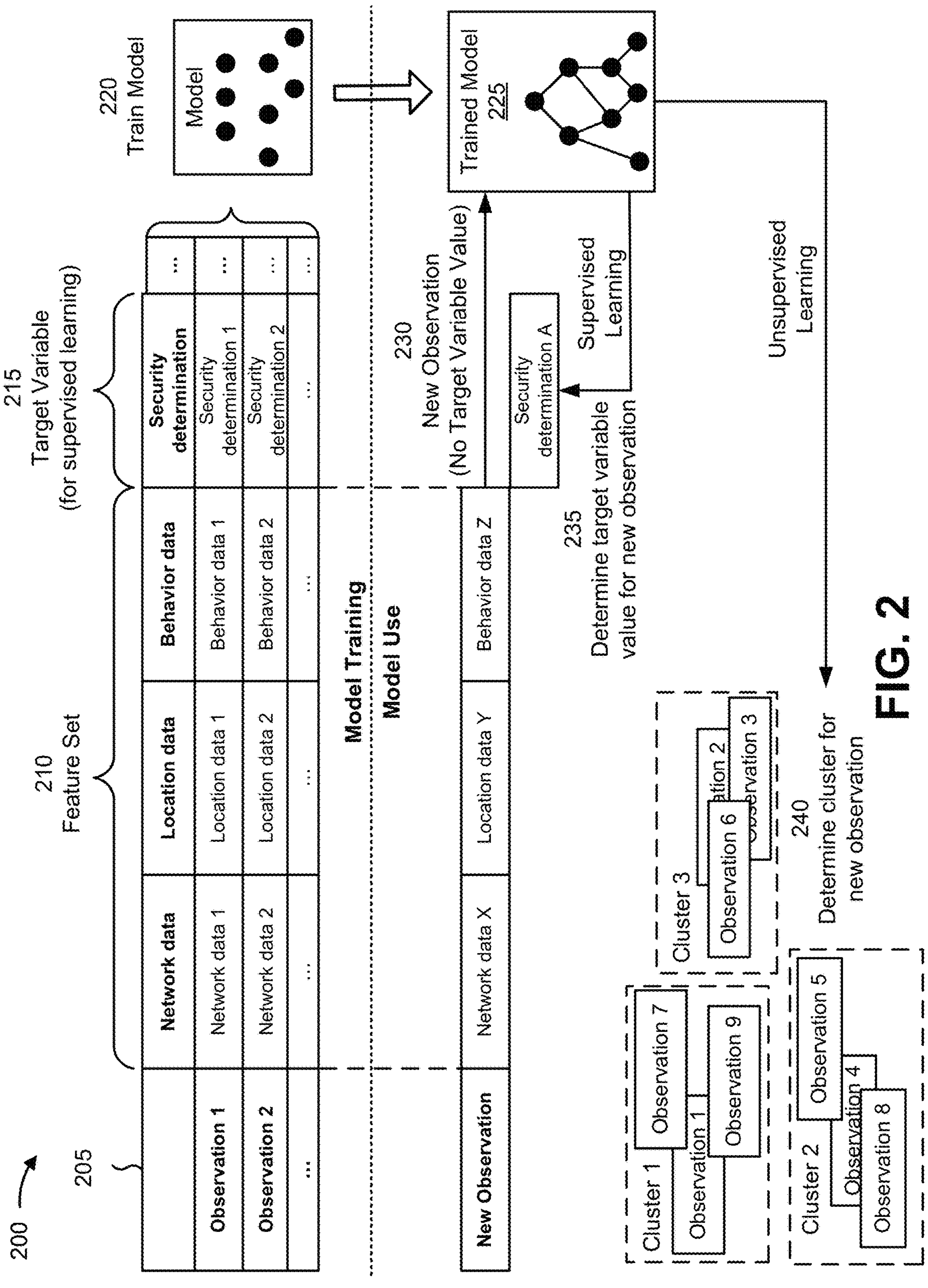
FIG. 2 is a diagram illustrating an example of training and using a machine learning model.

FIG. 2 is a diagram illustrating an example 200 of training and using a machine learning model for identifying security issues during a network attachment. The machine learning model training and usage described herein may be performed using a machine learning system. The machine learning system may include or may be included in a computing device, a server, a cloud computing environment, and/or the like, such as the security system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the security system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the security system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of network data, a second feature of location data, a third feature of behavior data, and so on. As shown, for a first observation, the first feature may have a value of network data 1, the second feature may have a value of location data 1, the third feature may have a value of behavior data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "security determination" and may include a value of security determination 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of network data X, a second feature of location data Y, a third feature of behavior data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of security determination A for the target variable of the component for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a network data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a location data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify security issues during a network attachment. The machine learning system enables recognition and/or identification of tens, hundreds, thousands, or millions of features and/or feature values for tens, hundreds, thousands, or millions of observations, thereby increasing accuracy and consistency and reducing delay associated with identifying security issues during a network attachment relative to requiring computing resources to be allocated for tens, hundreds, or thousands of operators to manually identify security issues during a network attachment.

As indicated above, FIG. 2 is provided as an example. Other examples may differ from what is described in connection with FIG. 2.

Figure 3:
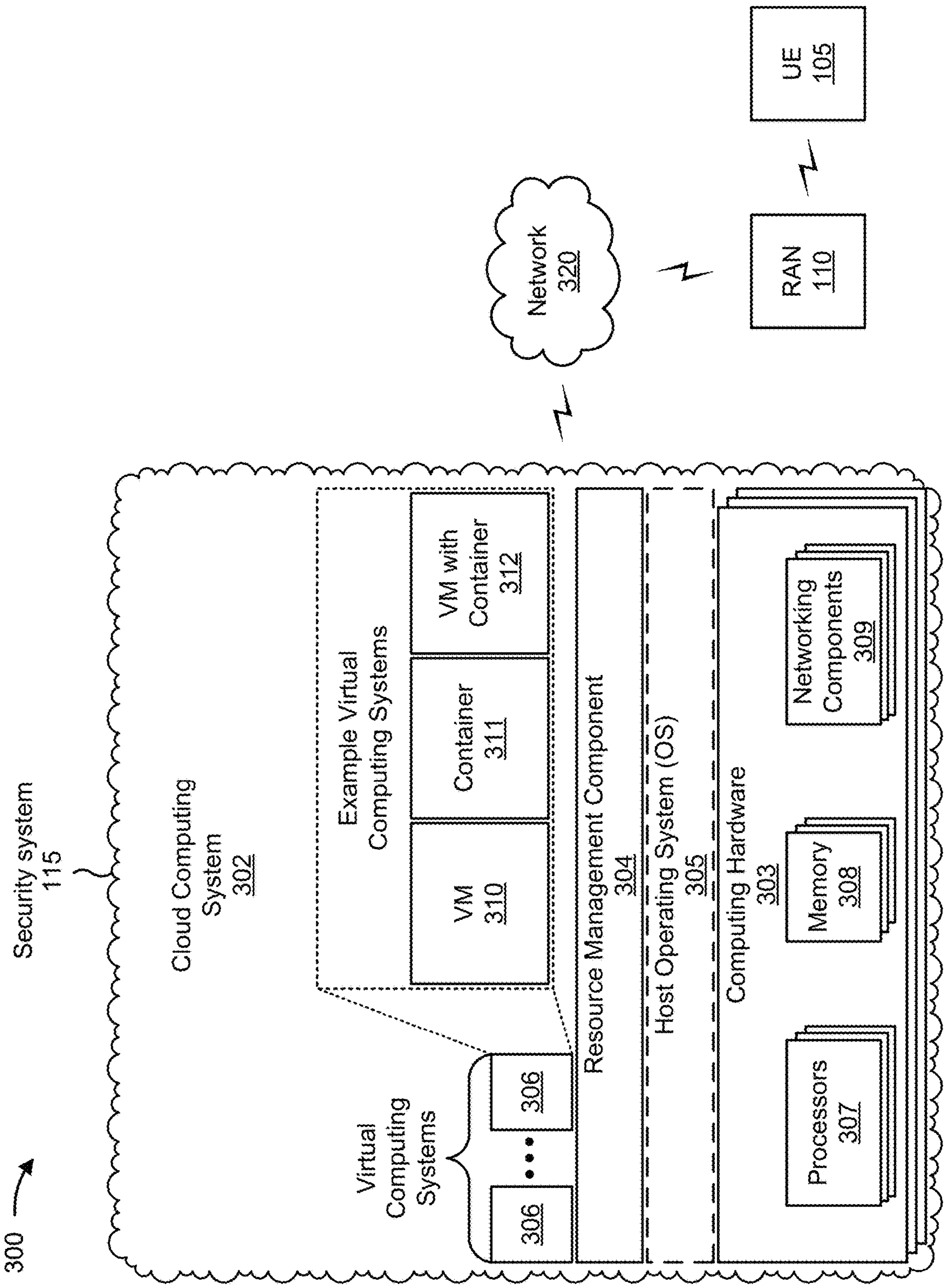
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the security system 115, which may include one or more elements of and/or may execute within a cloud computing system 302. The cloud computing system 302 may include one or more elements 303-312, as described in more detail below. As further shown in FIG. 3, the environment 300 may include the UE 105, the RAN 110, and/or a network 320. Devices and/or elements of the environment 300 may interconnect via wired connections and/or wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using the computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the security system 115 may include one or more elements 303-312 of the cloud computing system 302, may execute within the cloud computing system 302, and/or may be hosted within the cloud computing system 302, in some implementations, the security system 115 may not be cloud-based (e.g., may be implemented outside of a cloud computing system) or may be partially cloud-based. For example, the security system 115 may include one or more devices that are not part of the cloud computing system 302, such as a device 400 of FIG. 4, which may include a standalone server or another type of computing device. The security system 115 may perform one or more operations and/or processes described in more detail elsewhere herein.

The network 320 may include one or more wired and/or wireless networks. For example, the network 320 may include a cellular network (e.g., a 5G network, a 4G network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment

300 may perform one or more functions described as being performed by another set of devices of the environment 300.

Figure 4:
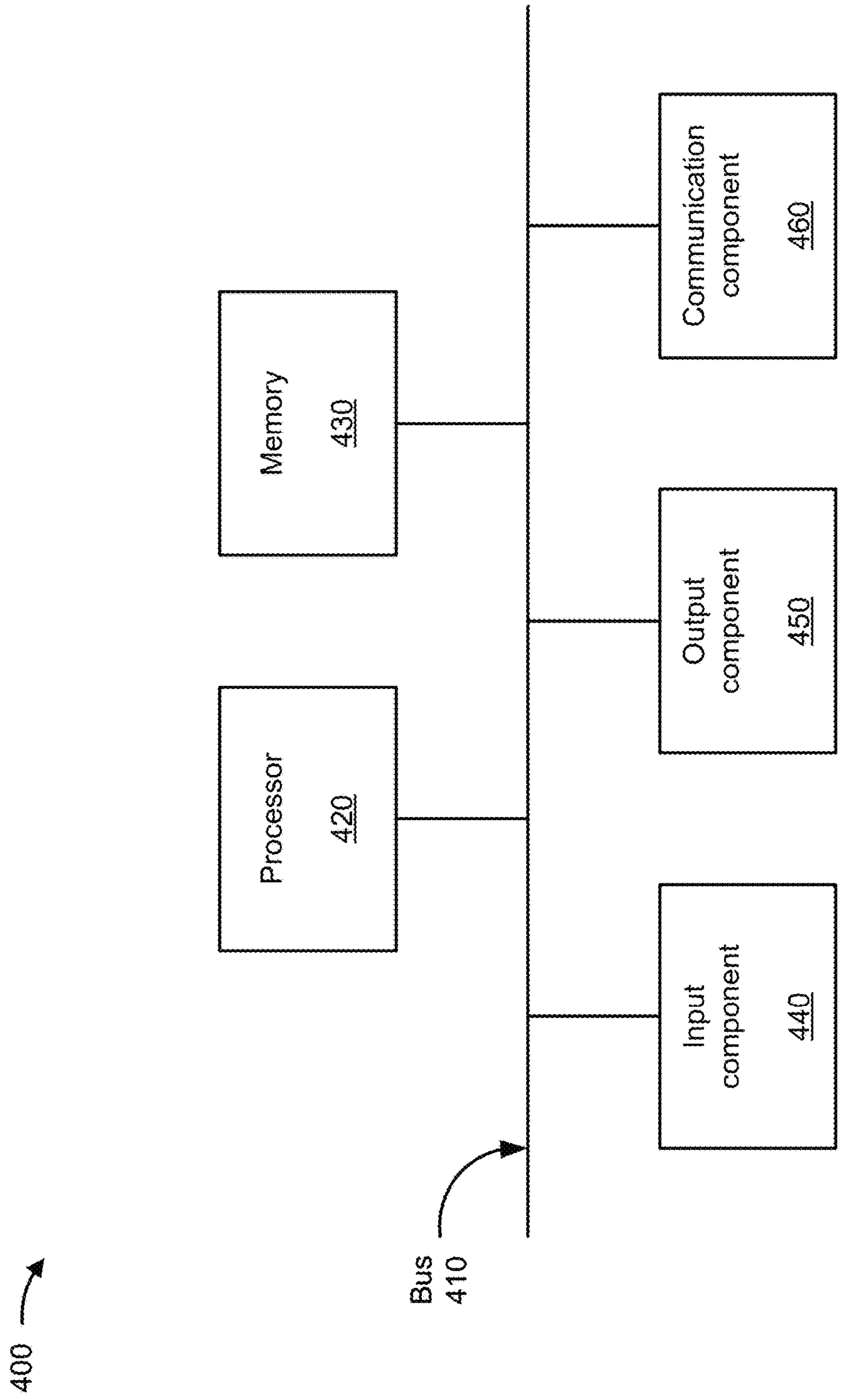
FIG. 4 is a diagram of example components of one or more devices of FIG. 3.

FIG. 4 is a diagram of example components of a device 400, which may correspond to the UE 105, the RAN 110, and/or the security system 115. In some implementations, the UE 105, the RAN 110, and/or the security system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
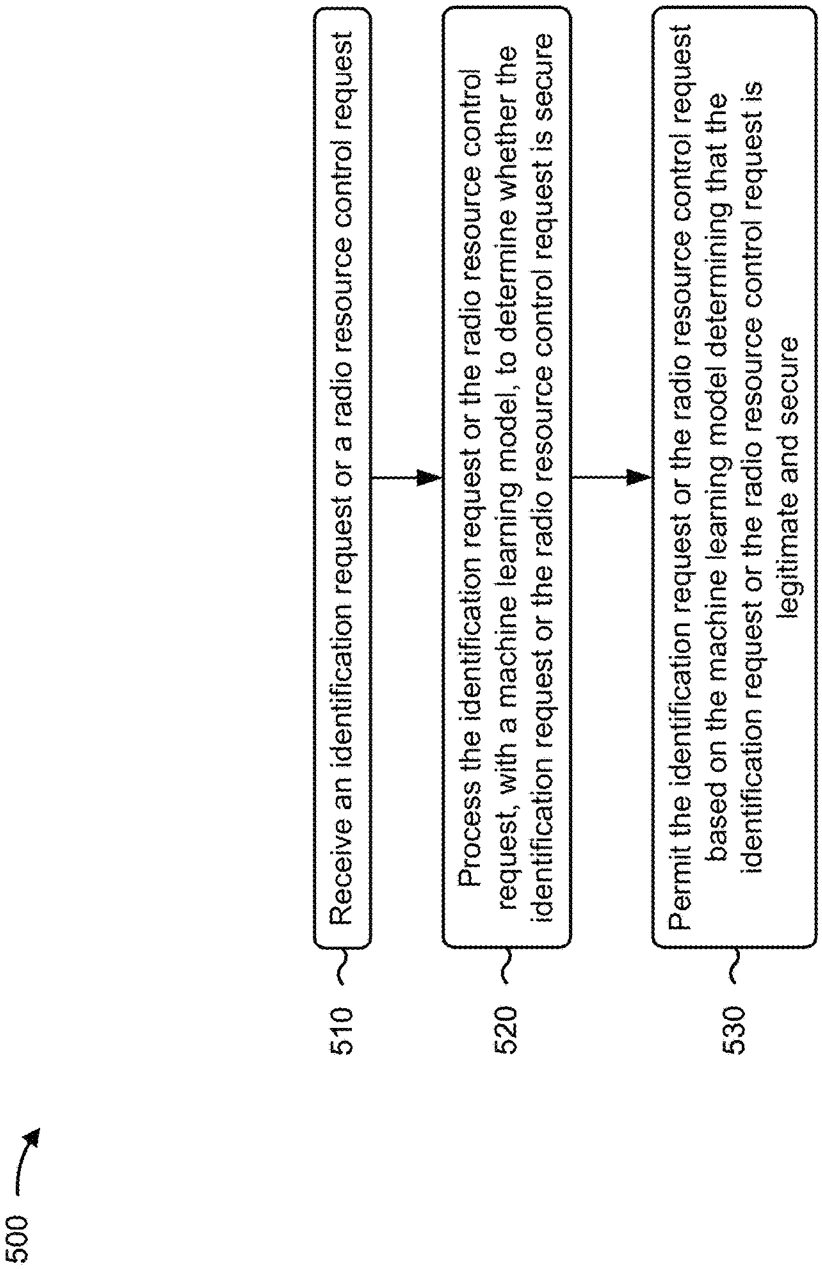
FIG. 5 is a flowchart of an example process for utilizing a machine learning model to identify security issues during a network attachment.

FIG. 5 is a flowchart of an example process 500 for utilizing a machine learning model to identify security issues during a network attachment. In some implementations, one or more process blocks of FIG. 5 may be performed by a device (e.g., the security system 115). In some implementations, one or more process blocks of FIG. 5 may be performed by another device or a group of devices separate from or including the device, such as a UE (e.g., the UE 105) and/or a RAN (e.g., the RAN 110). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an identification request or a radio resource control request (block 510). For example, the device may receive an identification request or a radio resource control request, as described above.

As further shown in FIG. 5, process 500 may include processing the identification request or the radio resource control request, with a machine learning model, to determine whether the identification request or the radio resource control request is secure (block 520). For example, the device may process the identification request or the radio resource control request, with a machine learning model, to determine whether the identification request or the radio resource control request is secure, as described above. In some implementations, the machine learning model is a pattern recognition model.

As further shown in FIG. 5, process 500 may include permitting the identification request or the radio resource control request based on the machine learning model determining that the identification request or the radio resource control request is legitimate and secure (block 530). For example, the device may permit the identification request or the radio resource control request based on the machine learning model determining that the identification request or the radio resource control request is legitimate and secure, as described above.

In some implementations, process 500 includes denying the identification request or the radio resource control request based on the machine learning model determining that the identification request or the radio resource control request is unsecure.

In some implementations, process 500 includes receiving a network attach request or another radio resource control request, processing the network attach request or the other radio resource control request, with the machine learning model, to determine whether the network attach request or the other radio resource control request is secure, and permitting the network attach request or the other radio resource control request based on the machine learning model determining that the network attach request or the other radio resource control request is secure. In some implementations, process 500 includes denying the network attach request or the other radio resource control request based on the machine learning model determining that the network attach request or the other radio resource control request is unsecure.

In some implementations, process 500 includes receiving historical network data identifying radio resource control requests, authentications, and identifiers of a plurality of user equipment, and historical behavior data identifying locations and behaviors of the plurality of user equipment, training the machine learning model with the historical network data and the historical behavior data, and implementing the machine learning model in the plurality of user equipment or a radio access network associated with the plurality of user equipment.

In some implementations, the historical network data identifies frequencies of the radio resource control requests, network device changes by the plurality of user equipment, and duplicate cell identifiers associated with the plurality of user equipment. In some implementations, the historical behavior data identifies last known locations and times associated with the plurality of user equipment, identifiers of wireless access points utilized by the plurality of user equipment, and locations of the wireless access points utilized by the plurality of user equipment.

In some implementations, process 500 includes providing a registration request to attach to a core network, receiving a message indicating that the registration request is authenticated, generating a PDU registration request based on receiving the message indicating that the registration request is authenticated, establishing a PDU session with the core network based on the PDU registration request, providing a RAN identifier to the core network, receiving, from the core network and based on the RAN identifier, cell identifiers around the RAN, and storing the cell identifiers. In some implementations, process 500 includes processing the cell identifiers, with the machine learning model, to verify the cell identifiers. In some implementations, process 500 includes storing the cell identifiers in the device or in a cloud-based device.

In some implementations, process 500 includes providing another registration request to attach to the core network, receiving, based on the other registration request, a registration response that includes a cell identifier selected by the RAN, extracting the cell identifier from the registration response, comparing the cell identifier and the stored cell identifiers to determine whether the cell identifier matches one of the stored cell identifiers, and denying the other registration request based on the cell identifier failing to match one of the stored cell identifiers.

In some implementations, process 500 includes generating a message indicating that the cell identifier matches one of the stored cell identifiers based on the cell identifier matching one of the stored cell identifiers; providing, to the RAN, the message indicating that the cell identifier matches one of the stored cell identifiers, to cause the RAN to provide the other registration request to the core network; receiving a message indicating that the other registration request is authenticated; generating another PDU registration request based on receiving the message indicating that the other registration request is authenticated; and establishing another PDU unit session with the core network based on the other PDU registration request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, from a user equipment (UE), a network attach request or a radio resource control request;

processing, by the device via a machine learning model, the network attach request or the radio resource control request, to determine whether the network attach request or the radio resource control request is secure; and permitting, by the device, the network attach request or the radio resource control request based on the machine learning model determining that the network attach request or the radio resource control request is legitimate and secure.

2. The method of claim 1, further comprising:

denying, by the device, the network attach request or the radio resource control request based on the machine learning model determining that the network attach request or the radio resource control request is unsecure.

3. The method of claim 1, further comprising:

receiving another network attach request or another radio resource control request;

processing the other network attach request or the other radio resource control request, with the machine learning model, to determine whether the other network attach request or the other radio resource control request is secure; and permitting the other network attach request or the other radio resource control request based on the machine learning model determining that the other network attach request or the other radio resource control request is secure.

4. The method of claim 3, further comprising:

denying the other network attach request or the other radio resource control request based on the machine learning model determining that the other network attach request or the other radio resource control request is unsecure.

5. The method of claim 1, further comprising:

receiving historical network data identifying radio resource control requests, authentications, and identifiers of a plurality of user equipment, and historical behavior data identifying locations and behaviors of the plurality of user equipment;

training the machine learning model with the historical network data and the historical behavior data; and implementing the machine learning model in the plurality of user equipment or a radio access network associated with the plurality of user equipment.

6. The method of claim 5, wherein the historical network data identifies frequencies of the radio resource control requests, network device changes by the plurality of user equipment, and duplicate cell identifiers associated with the plurality of user equipment.

7. The method of claim 5, wherein the historical behavior data identifies last known locations and times associated with the plurality of user equipment, identifiers of wireless access points utilized by the plurality of user equipment, and locations of the wireless access points utilized by the plurality of user equipment.

8. A device, comprising:

one or more processors configured to:

receive, from a user equipment (UE), a network attach request or a radio resource control request;

process the network attach request or the radio resource control request, via a machine learning model of the device, to determine whether the network attach request or the radio resource control request is secure; and permit the network attach request or the radio resource control request based on the machine learning model determining that the network attach request or the radio resource control request is secure; or deny the network attach request or the radio resource control request based on the machine learning model determining that the network attach request or the radio resource control request is unsecure.

9. The device of claim 8, wherein the machine learning model is a pattern recognition model.

10. The device of claim 8, wherein the one or more processors are further configured to:

provide a registration request to attach to a core network;

receive a message indicating that the registration request is authenticated;

generate a protocol data unit (PDU) registration request based on receiving the message indicating that the registration request is authenticated;

establish a PDU session with the core network based on the PDU registration request;

provide a radio access network (RAN) identifier to the core network;

receive, from the core network and based on the RAN identifier, cell identifiers around the RAN; and store the cell identifiers.

11. The device of claim 10, wherein the one or more processors are further configured to:

process the cell identifiers, with the machine learning model, to verify the cell identifiers.

12. The device of claim 10, wherein the one or more processors, to store the cell identifiers, are configured to:

store the cell identifiers in the device or in a cloud-based device.

13. The device of claim 10, wherein the one or more processors are further configured to:

provide another registration request to attach to the core network;

receive, based on the other registration request, a registration response that includes a cell identifier selected by the RAN;

extract the cell identifier from the registration response;

compare the cell identifier and the stored cell identifiers to determine whether the cell identifier matches one of the stored cell identifiers; and deny the other registration request based on the cell identifier failing to match one of the stored cell identifiers.

14. The device of claim 13, wherein the one or more processors are further configured to:

generate a message indicating that the cell identifier matches one of the stored cell identifiers based on the cell identifier matching one of the stored cell identifiers;

provide, to the RAN, the message indicating that the cell identifier matches one of the stored cell identifiers, to cause the RAN to provide the other registration request to the core network;

receive a message indicating that the other registration request is authenticated;

generate another PDU registration request based on receiving the message indicating that the other registration request is authenticated; and establish another PDU unit session with the core network based on the other PDU registration request.

15. A non-transitory computer-readable medium storing a set of instructions, the set of instructions comprising:

one or more instructions that, when executed by one or more processors of a device, cause the device to:

receive historical network data identifying radio resource control requests, authentications, and identifiers of a plurality of user equipment and historical behavior data identifying locations and behaviors of the plurality of user equipment;

train a machine learning model of the device with the historical network data and the historical behavior data to generate a trained machine learning model;

receive the network attach request or a radio resource control request;

process the network attach request or the radio resource control request, via the trained machine learning model, to determine that the network attach request or the radio resource control request is secure; and permit the network attach request or the radio resource control request based on the trained machine learning model determining that the network attach request or the radio resource control request is secure.

16. The non-transitory computer-readable medium of claim 15, wherein the one or more instructions further cause the device to:

implement the machine learning model in the plurality of user equipment or a radio access network associated with the plurality of user equipment.

17. The non-transitory computer-readable medium of claim 15, wherein the one or more instructions further cause the device to:

receive another network attach request or another radio resource control request;

process the other network attach request or the other radio resource control request, with the trained machine learning model, to determine whether the other network attach request or the other radio resource control request is secure; and selectively:

permit the other network attach request or the other radio resource control request based on the trained machine learning model determining that the other network attach request or the other radio resource control request is secure; or deny the other network attach request or the other radio resource control request based on the trained machine learning model determining that the other network attach request or the other radio resource control request is unsecure.

18. The non-transitory computer-readable medium of claim 15, wherein the historical network data identifies frequencies of the radio resource control requests, network device changes by the plurality of user equipment, and duplicate cell identifiers associated with the plurality of user equipment.

19. The non-transitory computer-readable medium of claim 15, wherein the historical behavior data identifies last known locations and times associated with the plurality of user equipment, identifiers of wireless access points utilized by the plurality of user equipment, and locations of the wireless access points utilized by the plurality of user equipment.

20. The non-transitory computer-readable medium of claim 15, wherein the machine learning model is a pattern recognition model.

* * * * *